United States Patent
Andreoli et al.

(10) Patent No.: US 7,020,670 B1
(45) Date of Patent: Mar. 28, 2006

(54) DOCUMENT CONSTRAINT DESCRIPTORS OBTAINED FROM USER SIGNALS INDICATING ATTRIBUTE-VALUE RELATIONS

(75) Inventors: Jean-Marc Andreoli, Meylan (FR); Uwe M. Borghoff, Hoehenkirchen (DE)

(73) Assignee: Xerox Corporation, Stamford, CT (US)

( * ) Notice: Subject to any disclaimer, the term of this patent is extended or adjusted under 35 U.S.C. 154(b) by 548 days.

(21) Appl. No.: 09/421,846

(22) Filed: Oct. 20, 1999

Related U.S. Application Data

(63) Continuation of application No. PCT/IB98/00757, filed on Apr. 23, 1998, and a continuation of application No. PCT/IB98/00758, filed on Apr. 23, 1998.

(30) Foreign Application Priority Data

| Apr. 23, 1997 | (GB) | .................................. 9708172 |
| Apr. 23, 1997 | (GB) | .................................. 9708175 |

(51) Int. Cl.
 G06F 15/00 (2006.01)
 G06F 17/00 (2006.01)
 G06F 17/21 (2006.01)

(52) U.S. Cl. .................. 707/516; 715/507; 707/1; 707/2; 707/3; 707/4; 707/5

(58) Field of Classification Search ................ 715/516, 715/507, 500; 707/10, 104, 1–5, 516; 717/8; 718/8
See application file for complete search history.

(56) References Cited

U.S. PATENT DOCUMENTS

| 5,404,294 | A | * | 4/1995 | Karnik ........................ 707/507 |
| 5,721,897 | A | * | 2/1998 | Rubinstein ...................... 707/2 |
| 5,794,233 | A | * | 8/1998 | Rubinstein ...................... 707/4 |
| 5,826,258 | A | * | 10/1998 | Gupta et al. .................... 707/4 |
| 5,913,214 | A | * | 6/1999 | Madnick et al. ............... 707/10 |
| 5,913,215 | A | * | 6/1999 | Rubinstein et al. ........... 707/10 |
| 5,963,938 | A | * | 10/1999 | Wilson et al. .................. 707/4 |
| 6,021,405 | A | * | 2/2000 | Celis et al. ..................... 707/2 |

(Continued)

FOREIGN PATENT DOCUMENTS

EP         0 691 619 A2    1/1996

OTHER PUBLICATIONS

Chakravarthy et al., Logic-Based Approach to Semantic Query Optimization, ACM Transactions on Database Systems, vol. 15, No. 2, Jun. 1990, pp. 162-207.*

(Continued)

*Primary Examiner*—William Bashore
(74) *Attorney, Agent, or Firm*—Oliff & Berridge PLC

(57) ABSTRACT

Document constraint descriptors are obtained from user signals. User signals are received indicating a set of attribute-value relations that can apply to documents. The user signals are used to obtain equivalent logical relations, and the logical relations are used to obtain the document constraint descriptor defining a set of one or more constraints equivalent to the logical relations. The user signals can be received through user interface circuitry of various types, including display/select user interfaces or a paper user interface in which a user marks a form that is scanned. The machine can be a portable computing device, a fixed computing device, or a multifunction device. The machine can also solve the set of constraints and can use the solution to obtain document references, such as Web URLs, indicating documents that satisfy the set of constraints. The user can then request more detail, or can obtain a printed version of a document.

16 Claims, 10 Drawing Sheets

U.S. PATENT DOCUMENTS

| | | | | |
|---|---|---|---|---|
| 6,052,693 A | * | 4/2000 | Smith et al. | 707/104 |
| 6,102,969 A | * | 8/2000 | Christianson et al. | 717/8 |
| 6,151,610 A | * | 11/2000 | Senn et al. | 707/516 |
| 6,374,252 B1 | * | 4/2002 | Althoff et al. | 707/102 |

OTHER PUBLICATIONS

Liu, Jane W. S., Algorithms for parsing search queries in systems with inverted file organization, ACM Transactions on Database Systems, Dec. 1976, vol. 1, Issue 4, pp. 299-316.*

Andreoli, Jean-Marc et al. "Constraint Agents for the Information Age," Journal of Universal Computer Science, vol. 1, No. 12, Dec. 1995, pp. 762-789.

Andreoli, J.M. et al. :The Constraint-Based Knowledge Broker Model: Semantics, Implementation and Analysis, Journal of Symbolic Computation, vol. 21, No. 4, 1996, pp. 635-676.

* cited by examiner

DOCUMENT CONSTRAINT DESCRIPTORS OBTAINED FROM USER SIGNALS INDICATING ATTRIBUTE-VALUE RELATIONS

This application is a continuation of International Applications PCT/IB98/00757 and PCT/IB98/00758, both filed 23 Apr. 1998, with respect to all shared subject matter. International Application PCT/IB98/00757 in turn claimed priority from Great Britain Application No. 9708175.6, filed 23 Apr. 1997, and International Application PCT/IB98/00758 in turn claimed priority from Great Britain Application No. 9708172.3, filed 23 Apr. 1997. WO-98/48359, the published version of International Application PCT/IB98/00757, and WO-98/48361, the published version of International Application PCT/IB98/00758, are both incorporated herein by reference in entirety.

FIELD OF THE INVENTION

The invention relates to techniques that obtain constraints for documents.

BACKGROUND

Andreoli, J.-M., Borghoff, U. M., Pareschi, R., and Schlichter, J. H., "Constraint Agents for the Information Age", *Journal of Universal Computer Science*, Vol. 1, No. 12, December 1995, pp. 762–789, describe constraint-based knowledge brokers which are concurrent agents that use signed feature constraints to represent partially specified information and can flexibly cooperate in the management of distributed knowledge.

Andreoli et al. disclose an operation named "scope-splitting", which relies on the use of negation. Under scope-splitting, a broker can split its scope, creating two brokers. In contrast with a basic feature constraint (BFC), which cannot include negation or disjunction, a signed feature constraint (SFC) is composed of a positive part and a list of negative parts, both of which are basic feature constraints. If the scope of a broker is represented by an SFC and the scope is split by a BFC, the two resulting split scopes can both be represented by SFCs. In an example, a database of documents by non-American authors about art can be split by a constraint "books written after 1950" into art books written after 1950 but not by an American author and art documents not authored by an American but not books subsequent to 1950.

Andreoli et al. also disclose techniques for solving SFCs. Constraint satisfaction over BFCs is defined by conditional rewrite rules, as is conventional. Given an SFC, its positive component is first normalized by the algorithm for BFCs. If the result is a contradiction, the SFC is unsatisfiable. But otherwise, the normalized positive component is inserted into each of the negative components, which are then normalized by the algorithm for BFCs. If a resulting negative component has a contradictory normal form, it is eliminated, but if it has a tautological normal form, the SFC is unsatisfiable. The SFC is thus satisfiable if and only if its normal form is not reduced to a contradiction. Andreoli et al. disclose an implementation in which the SFC solver is realized as a list-transforming algorithm with additional checks for constraint satisfaction.

Andreoli et al. also disclose that a set of initial brokers can be provided, each with predefined scope. In processing requests, new brokers and agent specialists are cloned to handle a subset of their parent scope. In responding to follow-on requests, answers from existing specialists can be used, and the scope splitting mechanism avoids redundant work. Complex requests require interactions with many other agents and information stored in the network. In large information networks, such as the World-Wide Web, the reuse of generated and already collected information is especially important.

SUMMARY OF THE INVENTION

The invention addresses problems that arise in obtaining constraints for documents.

With widespread availability of new electronic sources of information, such as e-mail, Internet access, and on-line information repositories, the number of electronic documents available to a computer user is multiplying. Documents can also be built dynamically by accessing and combining information existing over distributed sources. Hierarchical mark-up languages such as SGML can be used to define document templates that can be dynamically filled in with heterogeneous components. All of the various types of documents can in turn be given a degree of permanence by storing them in document management systems, thus entering them into a normal document lifecycle despite their differences.

The Document Management Alliance (DMA) has attempted to provide an industry standard for search, retrieval, storage, and conversion of electronic documents on heterogeneous document management systems.

Knowledge broker techniques as described by Andreoli et al., above, can be used to perform search and retrieval of electronic documents in accordance with the DMA standard and other such standards. The Andreoli et al. techniques employ feature constraints that can be built from atomic constraints, either sorts or features. A sort is a unary relation, expressing a property of a single entity, while a feature is a binary relation expressing a property linking two entities. The Andreoli et al. technique uses signed feature constraints, composed of both a positive part and a list of negative parts, where the positive part and each negative part, before negation, is a basic feature constraint that includes neither negation nor disjunction.

A typical user, however, has difficulty formulating sorts and features that will produce a desired constraint. As a result, techniques like that of Andreoli et al. are only useful for expert users who understand the logic of sorts and features and can formulate a set of sorts and features for a desired constraint.

This and related problems are referred to herein as the "constraint production problems".

The invention alleviates constraint production problems by providing techniques that obtain document constraint descriptors for documents from user signals. A document constraint descriptor includes information about a set of one or more constraints that documents could satisfy. Instead of requiring the user to provide a set of sorts and features, the techniques allow the user to provide attribute-value relations, which are relatively easy for typical users to provide. The techniques then convert the attribute-value relations to logical relations such as sorts and features from which a constraint descriptor can be obtained.

The new techniques can be implemented in a method for obtaining document constraint descriptors from user signals. The method can receive user signals indicating a set of attribute-value relations that can apply to documents. The method can use the user signals to obtain logical relations equivalent to the attribute-value relations. The method can then use the logical relations to obtain a document constraint descriptor defining a set of one or more constraints equivalent to the logical relations.

The method can be performed with a machine that includes user interface circuitry, through which the machine can receive a series of user signals. The machine can be a portable computing device with a touchscreen or a keyboard. Or the machine can be a fixed computing device with one or more of a touchscreen, keyboard, and mouse. Or the machine can be a multifunction device with a scanner, which can scan an image-bearing portable medium such as a form to produce electronic signals, in turn used to obtain the user signals; the form can include a field with a human readable indication of an attribute and an area a user can mark to indicate a set of values of the attribute.

The user interface circuitry can include display circuitry for presenting images and selection circuitry the user can operate to indicate items in the images. The document constraint descriptor can be stored in memory and the method can present an image that includes an item representing the descriptor, receive a user signal indicating the item, and, in response, obtain the stored descriptor.

The method can solve the set of constraints to obtain a solution and use the solution to obtain document references indicating electronic documents in a repository accessible through a network. The method can present an image that includes items representing the document references and, in response to a user signal indicating one of the items, can retrieve the item's electronic document. A portion of the electronic document can be displayed or the electronic document can be printed.

The new techniques can also be implemented in a machine. In general, the machine can include a processor and user interface circuitry for providing user signals to the processor. The processor can operate as described above, receiving user signals indicating a set of attribute-value relations applicable to documents, use the user signals to obtain logical relations, and use the logical relations to obtain a document constraint descriptor.

The new techniques are advantageous because they provide convenient ways for ordinary users to produce document constraint descriptors. The descriptors can be used to specify search requests, answers to requests, and the state of retrieval agents.

The following description, the drawings, and the claims further set forth these and other aspects, objects, features, and advantages of the invention.

DETAILED DESCRIPTION

A. Conceptual Background

Figure 1:
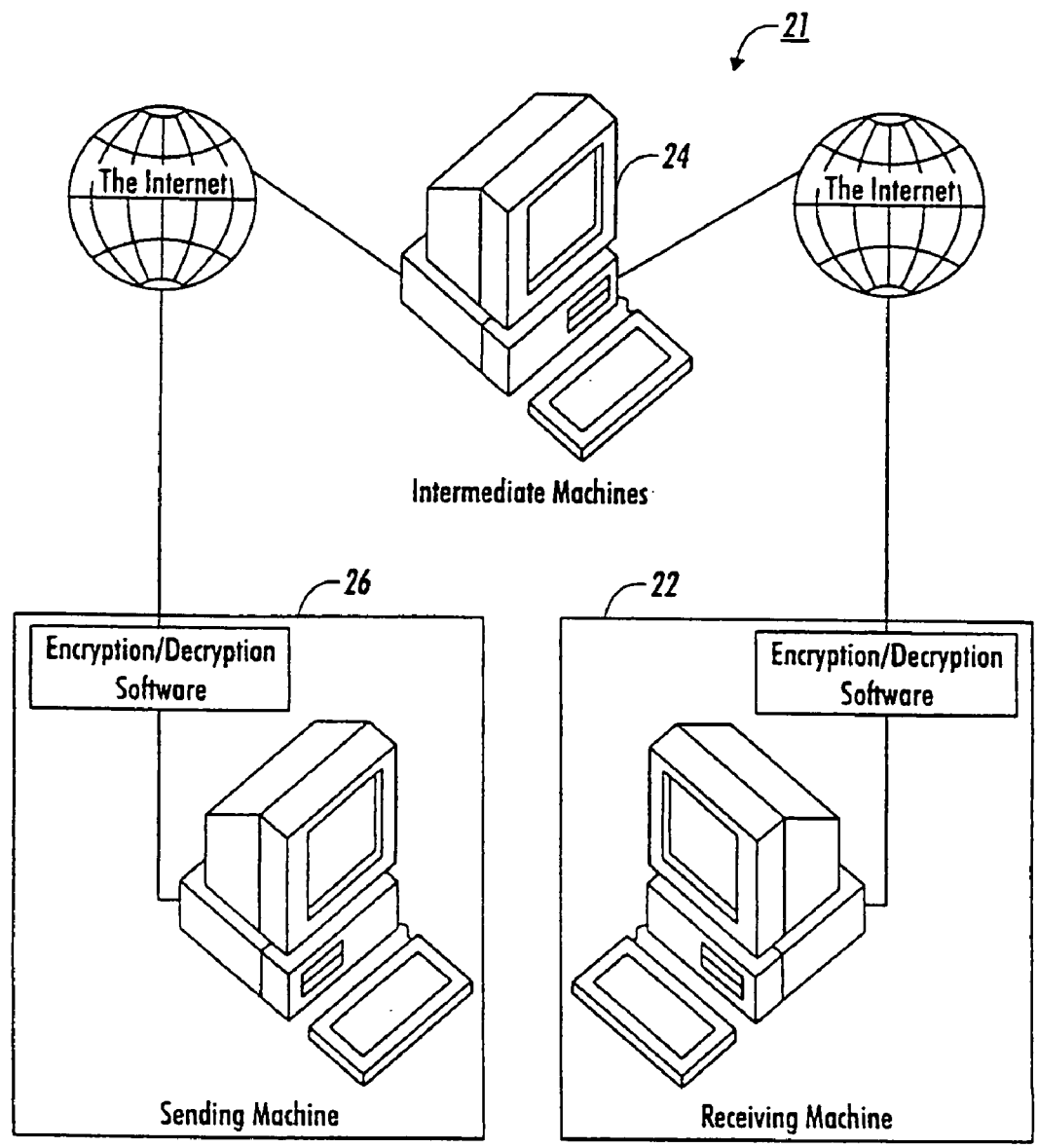
FIG. 1 is a schematic circuit diagram showing a network through which constraint descriptors could be transferred.

The following definitions are helpful in understanding the broad scope of the invention, and the terms defined below have the indicated meanings throughout this application, including the claims.

A "processor" or "processing circuitry" is a component of circuitry that responds to input signals by performing processing operations on data and by providing output signals. A processor may include one or more central processing units or other processing components. A processor can be a general purpose processor or a special purpose processor.

A "portable computing device" is a device that includes at least a processor and input/output circuitry and can be moved from place to place without difficulty.

A "fixed computing device" is a device that includes at least a processor and input/output circuitry and is not a portable computing device.

A processor or processing circuitry performs an operation or a function "automatically" when it performs the operation or function independent of concurrent human intervention or control.

A "user interface" or "user interface circuitry" is circuitry that can provide signals from a user. A user interface can, for example, include display circuitry for presenting images to a user and selection circuitry for providing user signals indicating items in the images. A user interface could include a scanner that produces electronic signals that include user signals, such as user markings in a field of a form.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

Any two components "communicate" when signals are transferred from one of the components to the other. Therefore, "communicating circuitry" is circuitry in a component that provides communication between the component and one or more other components. In addition to circuitry that provides direct connection or connection through a network, communicating circuitry can include transmitters and receivers for electromagnetic waves or other signals that do not require connections.

A "data packet" is an item of data that communicating circuitry can use to communicate, by converting a data packet into signals at a sending component and by extracting a data packet from signals at a receiving component.

In a very broad sense, a "document" is an object from which information can be extracted that can be understood by a human, possibly after decoding or other processing of the object. An "electronic document" is a document in an electronic form, such as when being stored in memory circuitry or when being transmitted between machines by communicating circuitry, even though the medium of communication may not itself be electronic.

A "document repository" is a component within which electronic documents may be stored for subsequent access and retrieval.

A "document reference" is an item of data that can be used to access a specific document stored by a document repository, and may be said to "indicate" or "identify" the document. Web URLs and other unique identifiers of documents are examples of document references.

To "obtain" or "produce" an item of data is to perform any combination of operations that begins without the item of data and that results in the item of data. To obtain a first item of data "based on" a second item of data is to use the second item to obtain the first item.

The notions of "constraint" and "satisfy" are related: A constraint is a condition that, when met, is satisfied. A "constraint that documents can satisfy" is therefore a condition that could be met by a document. A constraint can be a logical combination of constraints, such as a conjunction of a set of subconstraints, in which case the constraint "includes" the subconstraints. For example, constraints that documents can satisfy may be expressed as logical combinations of simpler constraints such as attribute-value relations, where each attribute-value relation is between an attribute that a document could have and a set of at least one value of the attribute. A constraint is "inconsistent" if it cannot be met because of its logical structure; if inconsistency of a constraint can be determined from logical structure, it is unnecessary to search or check whether a document can be found that meets the constraint—no document could possibly meet it. A constraint that is not inconsistent is "satisfiable" even though it may not in fact be satisfied by any stored document.

A "constraint descriptor" is an item of data that defines a constraint. A "document constraint descriptor" is a constraint descriptor defining a constraint that is applicable to documents.

An operation "compiles" a constraint if it operates on one or more items of data that provide information about a constraint to obtain a constraint descriptor that defines the constraint.

The terms "attribute" and "value" are related: An "attribute" is a characteristic that may have a "value". A "document attribute" is an attribute that documents could have. A "set of values" is any combination of one or more values. For example, a set could be a single value, a range of values, or a set of two or more non-contiguous values.

An "attribute-value relation" is an association between an attribute and a set of values the attribute could have. If the attribute is a document attribute, the attribute-value relation could apply to documents.

A "logical relation" is a relation between elements, where the relation can be evaluated as true or false. Sorts and features are examples of logical relations.

A set of logical relations is "equivalent" to a set of attribute-value relations if the logical relations are evaluated as true only if the attribute-value relations are met and are evaluated as false only if the attribute-value relations are not met.

Similarly, a set of constraints is equivalent to a set of logical relations only if the constraints are only satisfied when the logical relations are evaluated as true and the constraints are only not satisfied when the logical relations are evaluated as false.

A "solution" of a constraint or a set of constraints is an item of data that indicates whether the constraint or set of constraints is inconsistent or satisfiable and, if satisfiable, indicates a less redundant version that is equivalent to the constraint or set of constraints. In this context, the solution is "equivalent" to the constraint or set of constraints if the solution can only be satisfied if the constraint or set of constraints is satisfied and vice versa.

An operation "solves" a constraint or a set of constraints if it obtains a solution of the constraint or set of constraints.

B. System

The invention can be implemented using conventional computing devices with communication provided by conventional computer network technology, such as a local area network (LAN), a wide area network (WAN), or other appropriate technology. The invention has been successfully implemented using conventional Web browser software, such as Netscape Navigator, to provide cross-platform communication and document transfer over the Internet. The implementation employs a type of constraint descriptors referred to herein as "feature constraints", described in greater detail below.

FIG. 1 illustrates schematically network 21, in which the Internet transfers feature constraints between machines 22, 24, and 26. Each machine could be any conventional computing device connected to the Internet, such as a PC running Windows, a Mac running MacOS, or a minicomputer or other machine running Unix. Other system configurations could be employed, such as those described by Flynn et al., above, and other network configurations could be employed, including those described in EP-A-772,857 and U.S. Pat. No. 5,692,073. In general, each of the computing devices connected to network 21 can include user interface circuitry for receiving user signals, a processor whose operations are responsive to the user signals, and memory for storing data. The user interface circuitry can, for example, include display circuitry such as circuitry to present images on a CRT, LCD, or other display device. The user interface circuitry can also include selection circuitry for receiving signals indicating items in images presented by the display circuitry, such as circuitry to receive signals from a keyboard, mouse, touchscreen sensor, joystick, or other such device.

In response to a request from a user at receiving machine 22, a document stored on sending machine 26 can be retrieved and sent over the Internet to receiving machine 22, via one or more intermediate machines 24. As is well known, a document accessible through the Web can be retrieved using as a unique identifier its Web URL, as described by Flynn et al., above. As further described by Flynn et al., additional devices of various types can be connected to network 21, including scanners, printers, copiers, and multifunction devices capable of scanning, printing, faxing, etc., described, for example, in EP-A-741,487. Each machine connected to network 21 can also be equipped with appropriate hardware and software for communication with portable computing devices, such as conventional hardware and software for communication with personal digital assistants (PDAs), handheld PCs, pocket or wristwatch computers, or other portable computers.

A portable computing device and techniques by which search requests may be generated in response to a data packet from a user of a portable computing device are disclosed in copending, coassigned U.S. patent application Ser. No. 09/421,752, entitled "Transferring Constraint Descriptors for Documents", incorporated herein by reference. A portable computing device an include user interface circuitry for receiving user signals. The user interface circuitry can include display circuitry for presenting images on a small bitmap screen and selection circuitry for receiving user signals indicating items in images presented on the screen, such as through circuitry that senses a position at which the screen is touched by a finger tip or a pointer and circuitry for receiving signals provided through push buttons. The user interface circuitry can also include circuitry for providing audible signals to the user through a tone generator.

Portable computing devices, and some or all fixed computing devices connected to network 21 can be equipped for infrared communication or for wireless communication at other wavelengths, such as by well known radio technology. For example, data packets transmitted between a portable computing device and other devices, such as data packets encoding information enabling document retrieval, can conform to the physical and link layer formats (IrLAP) described in the industry standard Infrared Data Association (IrDA) specification, version 1.0, or subsequent versions, as is well known in the art. For this purpose, a portable computing device can have 19.2 Kb/s bi-directional IR communication circuitry for transmitting and receiving through a diode transmitter/receiver.

A portable computing device could also include communication circuitry for providing a wired or docking link to other portable computing devices or to fixed computing devices, using conventional techniques.

A portable computing device can include a conventional microprocessor that presents images on its screen, that receives user signals through the user interface circuitry and through its transmitter/receiver, and that provides signals to other computing devices through its transmitter/receiver. The microprocessor can be connected to conventional memory circuitry for storage of data.

As will be understood from the description below, the microprocessor could receive user signals indicating attribute-value relations such as sets of values for one or more attributes of a document, could obtain equivalent logical relations, could then obtain an equivalent document constraint descriptor for a set of constraints, and could store the constraint descriptor in memory. Then, in response to further user signals, the microprocessor could encode the document constraint descriptor in a data packet and provide the data packet for transmission to another device. For example, the microprocessor could present an icon with a description of the constraint descriptor and, in response to a user signal indicating the icon, could transmit a data packet encoding the constraint descriptor to a fixed computing device to initiate a search for documents satisfying the set of constraints.

The microprocessor could operate in various other ways, some of which are mentioned below.

C. Knowledge Brokers and Feature Constraints

Although the invention could be implemented in various ways, the invention has been successfully implemented by programming computing devices to employ knowledge brokers and feature constraints as described by Andreoli et al., above. A demonstration of a prototype can be viewed at the web site page "www.xrce.xerox.com/research/ct/projects/cbkb/home.html." This section reviews relevant aspects of knowledge brokers and feature constraints.

Brokers are software agents that can process knowledge search requests. Knowledge is taken here to be any piece of electronic information intended to be publicly accessible. Different, possibly distributed, information sources are assumed to be available, from a simple file in a user's directory to a database local to a site, up to a wide area information service (WAIS) on the Internet, for example.

When receiving a request, a broker may have sufficient knowledge to process it, or may need to retrieve more knowledge. For that purpose, it releases sub-requests, aimed at other brokers. Thus, knowledge retrieval is achieved by the collaboration of all the brokers, which are alternatively service providers processing requests and clients of these services generating sub-requests. The infrastructure required to support such collaboration, and the way knowledge is stored locally within each broker can be understood from Andreoli, J.-M., Borghoff, U., and Pareschi, R., "The Constraint-Based Knowledge Broker Model: Semantics, Implementation and Analysis", *Journal of Symbolic Computation*, Vol. 21, No. 4, 1996, pp. 635–676, incorporated herein by reference. The following discussion addresses rather the knowledge manipulations occurring within each broker.

In order to collaborate, the brokers must at least understand each other. This can be achieved by formulating all requests and all answers to requests in a common language, even if the brokers may perform local translations. Logic provides an adequate language for such a purpose. A request can be expressed by a pair <x, P> where x is a logical variable and P a logical formula involving x, meaning "Retrieve knowledge objects x such that the property expressed by formula P holds". Interestingly, an answer to such a request can be expressed in the same formalism, i.e. a pair <x, Q> meaning "There exists a knowledge object x satisfying the property expressed by formula Q". The requirement here is that P must be a logical consequence of Q, so that the answer contains at least as much knowledge as the request. Moreover, the same logical formalism can be used to capture the scope of a broker, i.e. the area of knowledge it is concerned with: A broker with scope <x, R> means "I am not capable of retrieving knowledge objects x which do not satisfy the property expressed by formula R". In many situations, the scope of a broker may vary, because it is specialized or, on the contrary, expands its capacities, either externally or due to the knowledge retrieval process itself.

In other words, logic provides a common language in which requests, answers, and scopes can all be expressed. Brokers then perform logical operations on these three components. The most important logical operation, from which all the others can be reconstructed, is satisfiability checking, i.e. deciding whether some object could satisfy the property expressed by a formula, or, on the contrary, whether it is intrinsically contradictory. Unfortunately, it is well known that this operation, for full classical logic, is not algorithmic, i.e. it is provably impossible to write a program which implements it and always terminates. Given this limitation, a great deal of research in knowledge representation has been focused on identifying fragments of classical logic in which satisfiability is algorithmically decidable. The trade-off here is between expressive power and tractability: The empty fragment, for example, is obviously tractable, but it is not very expressive.

The most popular fragment which emerged is known as "feature constraints". The satisfiability problem in this case is also known as "feature constraint solving".

As is known, feature constraints can be built from atomic constraints that are either sorts or features. A sort is a unary relation, expressing a property of a single entity. For example, P:person expresses that an entity P is of sort person. A feature is a binary relation expressing a property linking two entities. For example, P:employer->E expresses that entity P has an employer, which is an entity E. Apart from sorts and features, most feature constraint systems also allow built-in relations such as equality and inequality, and such relations are also referred to herein as "built-in predicates" or "built-in constraints".

The full fragment of feature constraints, where the atomic components mentioned above are allowed to be combined by all the logical connectives (conjunction, disjunction, negation and quantifiers), although very expressive, is hardly tractable. A subfragment called "basic feature constraints" (BFC) has been considered, where negation and disjunction are simply forbidden. Efficient constraint solving algorithms have been proposed for this sub-fragment. However, a drawback is that the complete absence of negation puts strong limitations on the kind of operations a knowledge broker may wish to perform.

Brokers can use a powerful operation, referred to as "scope-splitting", which relies on the use of negation. Indeed, a broker may wish to split its scope, specified by a pair <x, P> according to a criterion expressed by a formula F, thus creating two brokers with scope P∧F and P∧¬F. Thus, a broker in charge of bibliographic information may wish to split its scope into two new scopes: "books written after 1950", which can be represented by a BFC that includes two feature constraints and a built-in constraint X
  X: book
  X: year->Y
  Y>1950, and its complement, i.e. "books written before 1950 or documents which are not books"; this latter scope cannot be expressed using BFC, because negation and disjunction cannot be dispensed with. It has been discovered that the scope splitting operation is useful in many situations, for example to implement brokers capable of memorizing and reusing information gathered during their lifetime. A broker can, for example, use, on the one hand, a fragment of feature constraints, called "signed feature constraints" (SFC), which allows limited use of negation, precisely capable of expressing the kind of split scope mentioned above, and, on the other hand, an efficient constraint solving method for SFC.

A signed feature constraint is composed of a positive part and a list of negative parts, both of them being basic feature constraints. For example, the following signed feature constraint P
+P: person,
  P: employer->E,
  E: "Xerox"
-P: nationality->N,
  N: "American"
-P: spouse->P'
  P': person
  P': employer->E'
  E': "Xerox"

specifies a Xerox employee who is not American and is not married to another Xerox employee.

Figure 2:
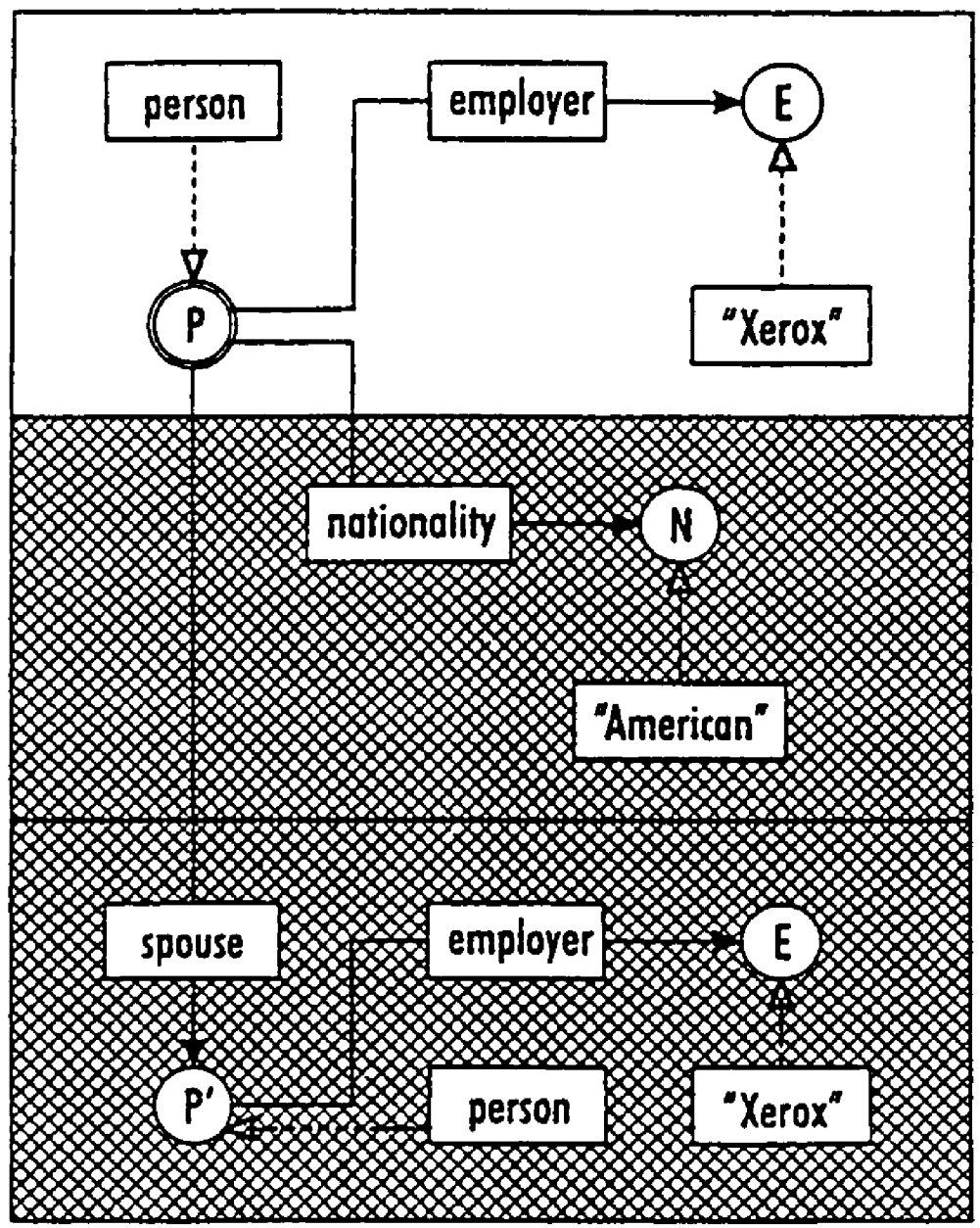
FIG. 2 is a schematic diagram showing the scope defined by a constraint.

This SFC can be represented graphically as in FIG. 2. The round boxes denote the entities (logical variables), the sort relations (unary) are represented by dashed arrows labeled by the name of the sort in a square box, the feature relations (binary) are represented by plain arrows labeled by the name of the feature in a square box. Built-in predicates (not present in the example) could be represented by rhombuses. The positive part of the SFC is contained in the top box and marks the distinguished entity of the scope (p in the example) by a double round box. The negative parts of the SFC are contained in the lower boxes in gray.

The main interest of SFCs comes from the following property: If the scope of a broker is represented by an SFC $e_o$, and this scope is split by a BFC e, then the two resulting split scopes $e^+$, $e^-$ are both SFCs.

Indeed, $e^+$ can be obtained by merging the positive part of $e_o$ with the BFC e, and $e^-$ can be obtained by extending $e_o$ with a new negative part containing e alone. For example, assume a broker in charge of a bibliographical database containing various documents (books, videos etc.) about art, but not authored by an American. The database can be represented by the SFC X
+X: topic->T
  T: "Art"
-X: author->A
  A: nationality->N
  N: "American"

The SFC may be split by the constraint "books written after 1950", expressed by the BFC X
  X: book
  X: year->Y
  Y>1950

The resulting scopes are simply

X
+X: book
  X: topic->T
  X: year->Y
  T: "Art"
  Y>1950
-X: author->A
  A: nationality->N
  N: "American"

i.e. "Art books written after 1950 but not by an American author" and

X
+X: topic->T
  T: "Art"
-X: author->A
  A: nationality->N
  N: "American"
-X: book
  X: year->Y
  Y>1950 i.e. "Art documents not authored by an American but not books subsequent to 1950".

Most constraint systems make a number of assumptions on the nature of sorts and features, called the axioms of the systems. These axioms are crucial to the satisfiability algorithm, since they determine when a feature constraint is contradictory and when it is satisfiable.

For the purpose of simplicity, the implementation disclosed here makes use of a slight variant of the basic axiom system used in Aït-Kaci, H. et al., "A Feature-Based Constraint-System for Logic Programming with Entailment", *Theoretical Computer Science*, Vol. 122, 1994, pp. 263–283, although it will be appreciated by persons skilled in the art that the principles of the method apply to other sets of axioms as well.

1. Features are functional: This means that if two pairs of entities which are constrained by the same feature have the same first term, they also have the same second term. For example, it can be considered that the feature spouse is functional (within a specific cultural setting), meaning that a person cannot have two spouses: If, for a person x, we have X:spouse->Y and X:spouse->Z, then the entities Y and z coincide (i.e. denote the same person). Other systems allow multi-valued features.

2. Sorts are disjoint: this means that no entity can be of two distinct sorts. For example, a book is not a person: We cannot have an entity x with X:book and X:person. Other systems consider hierarchies of sorts where some entities can have multiple sorts as long as they have a common denominator in the hierarchy.

3. There is a distinguished subset of sorts, called "value" sorts, so that no two distinct entities can be of the same value sort. Traditional basic elements (strings, numbers, etc.) are typical value sorts: For example, the string "Xerox" or the number 1950 are value sorts. Value sorts are not allowed to have features: This is the only axiom connecting sorts and features. Other systems consider more refined connections between sorts and features.

4. There is a distinguished built-in binary predicate, equality, with the traditional congruence axioms (which involve sorts and features). The axioms describing all the other built-in predicates are assumed to contain no mention of sorts and features.

These axioms form a theory T, for example, and are formally written, for example, as the following three sets of axioms.

Specific Axioms for Features and Sorts:
Let $\tau, \tau^1$ denote any sorts, and $f$ denote any feature.

$\forall x, y, zx \xrightarrow{f} y \neg x \xrightarrow{f} z \supset y = z$ $\forall x \neg (x:\tau \wedge x:\tau')$ if $\tau \neq \tau'$ $\forall x, yx:\tau \wedge y:\tau \supset x=y$ if $\tau$ is a value sort $\forall x, y \neg (x:\tau \wedge x \xrightarrow{f} y)$ if $\tau$ is a value sort Congruence Axioms for Equality:
Let p denote any built-in predicate. The traditional congruence axioms are, for example:

$\forall x \; x=x$ $\forall x, y \; x=y \supset y=x$ $\forall x, y, z \; x=y \wedge y=z \supset x=z$ $\forall x, y \; z:\tau \wedge x=y \supset y:\tau$ $\forall x, y, z \; x \xrightarrow{f} y \wedge x=z \supset z \xrightarrow{f} y$ $\forall x, y, z \; x \xrightarrow{f} y \wedge y=z \supset x \xrightarrow{f} z$ $\forall \bar{x}, y \; p(\bar{x}) \wedge x_i = y \supset p(\bar{y})$ where i is some index in the list of variable $(\bar{x})$ and $(\bar{y})$ is identical to $(\bar{x})$ except that $y_i = y$ Built-in Predicate Axioms:
They must not mention sorts and features. For example, disequality can be axiomatized by $\forall x, y \; x \neq y \vee x = y$ $\forall x \; \neg(x \neq x)$ Precedence constraints are axiomatized by $\forall x \neg (x<x)$ $\forall x, y, z \; x<y \wedge y<z \supset x<z$ The built-in predicates $>$, $\leq$, $\geq$ can then be defined from $<$ and equality.

Based on this axiom system, a set of SFCs can be solved by a constraint satisfaction process as follows:

First, it is assumed that satisfiability over built-in predicates is decidable. This means that there is an algorithm which, given a formula F using only built-in predicates (F is also called a built-in constraint), can decide whether F is a logical consequence of the theory T(written $\vdash_T F$).

Constraint satisfaction over BFCs is defined by a set of conditional rewrite rules over BFCs. For example, where a BFC is represented as a pair (B|Γ) where B is a built-in constraint and Γ an unordered list of sort and feature constraints (read conjunctively), the following rules, for example, correspond to simplifications of the BFCs. In the rules set forth below, $\perp$ denotes the contradiction. The set of conditional rewrite rules include:

$(B|x \xrightarrow{f} y, =1 \xrightarrow{f} t, \Gamma) \to (B \wedge y = t | x \xrightarrow{f} y, \Gamma)$ if $\vdash \tau B \supset x = z$ $(B|x:\tau, y:\tau, \Gamma) \to (B|x:\tau, \Gamma)$ if $\vdash \tau B \supset x=y$ and $\tau$ is not a value sort.

$(B|x:\tau, y:\tau, \Gamma) \to (B \wedge x=y|x:\tau, \Gamma)$ if $\tau$ is a value sort.

The following rules, for example, correspond to the detection of inconsistencies:

$(B|\Gamma) \to \perp$ if $\vdash \tau \neg B$ $(B|x:\tau, y, :\tau', \Gamma) \to \perp$ if $\vdash \tau B \supset x=y$ and $\tau \neq \tau'$ $(B|x:\tau, y \xrightarrow{f} z, \Gamma) \to \perp$ if $\vdash \tau B \supset x=y$ and $\tau$ is a value sort.

The following property justifies the algorithm $$(B|\Gamma) \to \perp \text{ if and only if } \vdash \tau \forall \neg \left(B \bigwedge_{c \in \Gamma} c\right).$$

These rules have the following properties:

(a) The system of rules is convergent and hence defines a "normal form" for BFCs. This can be shown in a classical way by proving that the system is "Church-Rosser" (critical pairs converge) and "Noetherian" (the size of the terms strictly decrease by rewriting).

(b) A BFC is satisfiable if and only if its normal form is not reduced to the contradiction. One implication can be proved by showing that rewrite steps preserve satisfiability. The reverse implication can be proved by displaying a model that satisfies BFCs whose normal form is not reduced to the contradiction.

Thus the rewrite rules describe the steps of a constraint satisfaction algorithm. This algorithm always terminates because the system of rewrite rules is convergent. It is to be noted that the definition of the rules relies on satisfiability tests of built-in constraints, which have been assumed decidable. This means that the algorithm is modular and can accommodate any kind of built-in constraints as long as a proper built-in constraint satisfaction algorithm is provided.

Rewrite rules for a constraint satisfaction algorithm can be implemented in a naive way in some symbolic language like Lisp or Prolog, or can be optimized, taking into account the properties of the specific built-in constraints which are used.

The algorithm for constraint satisfaction over SFCs can informally be described with the following example. For example, an SFC is represented as an unordered list of BFCs prefixed with a sign (+ or −); by definition, one and only one component is positive. Let S be an SFC. The SFC-normal form of S is written S and is obtained by the following algorithm:

Let $c_o$ be the BFC-normal form of the positive component of S.

If $c_o = \perp$ Then

Return $\perp$

Else $C_o$ is f the form $(B_o|\Gamma_o)$

Let $\{(B_i|\Gamma_1)\}i=1, \ldots, n$ be the list of negative components of S.

For each $i=1, \ldots, n$

Let $c_i$ be the BFC normal form of $(B_o \wedge B_i|\Gamma)$.

If there exists $i \in 1, \ldots, n$ such that $c_i=(B|\Gamma)$ and $\tau B$ and $\Gamma$ is empty Then Return $\perp$ Else Let $I=\{i \in 1, \ldots, n$ such that $c_i \neq \perp\}$ Return $\{+c_{o1}\{-c_i\}i \in 1\}$.

The following property justifies the algorithm:

$$\left[ +(B_o|\Gamma_o), \{-(B_i|\Gamma_i)\} \frac{n}{i=1} = \right.$$

$$\left. \perp \text{ if and only if } \tau \forall \neg \left[\left(B_o \wedge \bigwedge_{c \in \Gamma_o} c\right) \wedge \bigwedge_{i=1}^{n} \neg \left(B_i \wedge \bigwedge_{c \in \Gamma_i} c\right)\right] \right].$$

Therefore, for example, given an SFC, its positive component is first normalized by the algorithm for BCFs. If the result is a contradiction, the whole SFC is unsatisfiable. Otherwise, the normalized positive component is inserted in each of the negative components, which are then normalized by the algorithm for BFCs. If a resulting negative component has a contradictory normal form, it is eliminated, and if it has a tautological normal form the whole SFC is unsatisfiable. The normal form for SFCs thus obtained has the following property:

An SFC is satisfiable if and only if its normal form is not reduced to the contradiction. A non-contradictory normal form is thus a solution of the SFC.

D. Transactions

FIGS. 3–10 illustrate several transactions that can be performed in the current implementation.

The processor of a device can obtain a document constraint descriptor from user input signals in a number of ways.

Figure 3:
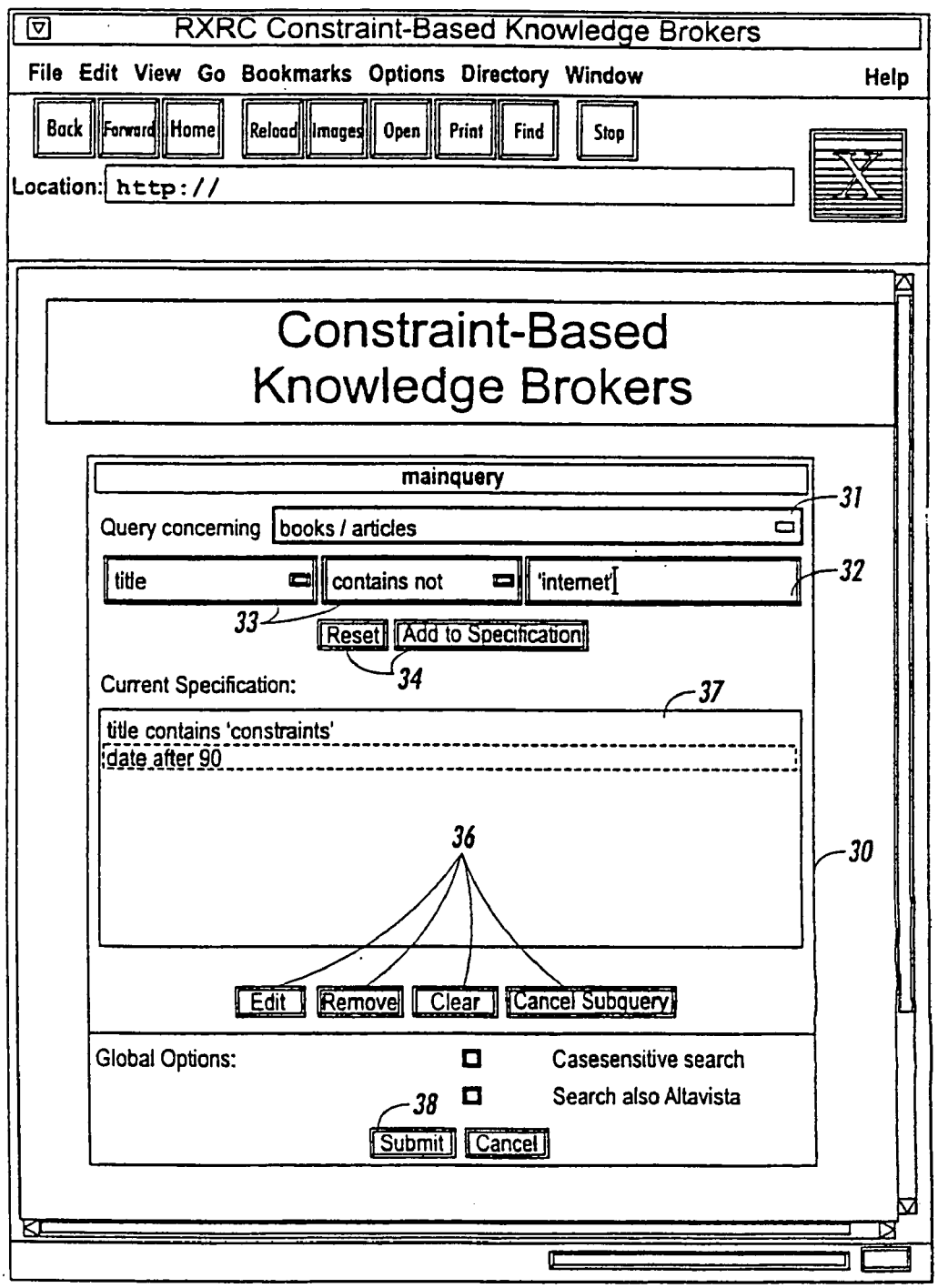
FIG. 3 is a schematic version of an image presented by a fixed computing device in response to user signals indicating attribute-value relations.

FIG. 3 shows an image presented by display circuitry of a fixed computing device while a user is entering a query, e.g. "books or articles after 1990 in which the title contains 'constraints' but does not contain 'internet'". The image includes boxes any of which the user can select by mouse inputs, after which the user can type or complete an element of the query in the selected box. For example, within a dedicated window, the user can enter a query into main query entry box 30, which can be implemented using conventional techniques. Box 30 includes boxes 31 and 32 either of which the user can select by mouse signals, after which the user can type into or complete an element of a query in the selected box. As shown, box 31 includes the element "books/articles" of a query, while box 32 includes the element "internet".

The image in FIG. 3 also includes buttons 33 that the user can select by mouse inputs to select an attribute of a document, such as "title", or a constraint operator applicable to an attribute, such as "contains not". Additional buttons 34 and 36 allow the user to restart, add to, edit, build up, or otherwise modify a query.

Each element of the query is added to the current specification of the query, and the image in FIG. 3 also includes box 37 that contains the current specification. The image also includes button 38, which the user can select to launch a search based on the current specification of the query.

Figure 4:
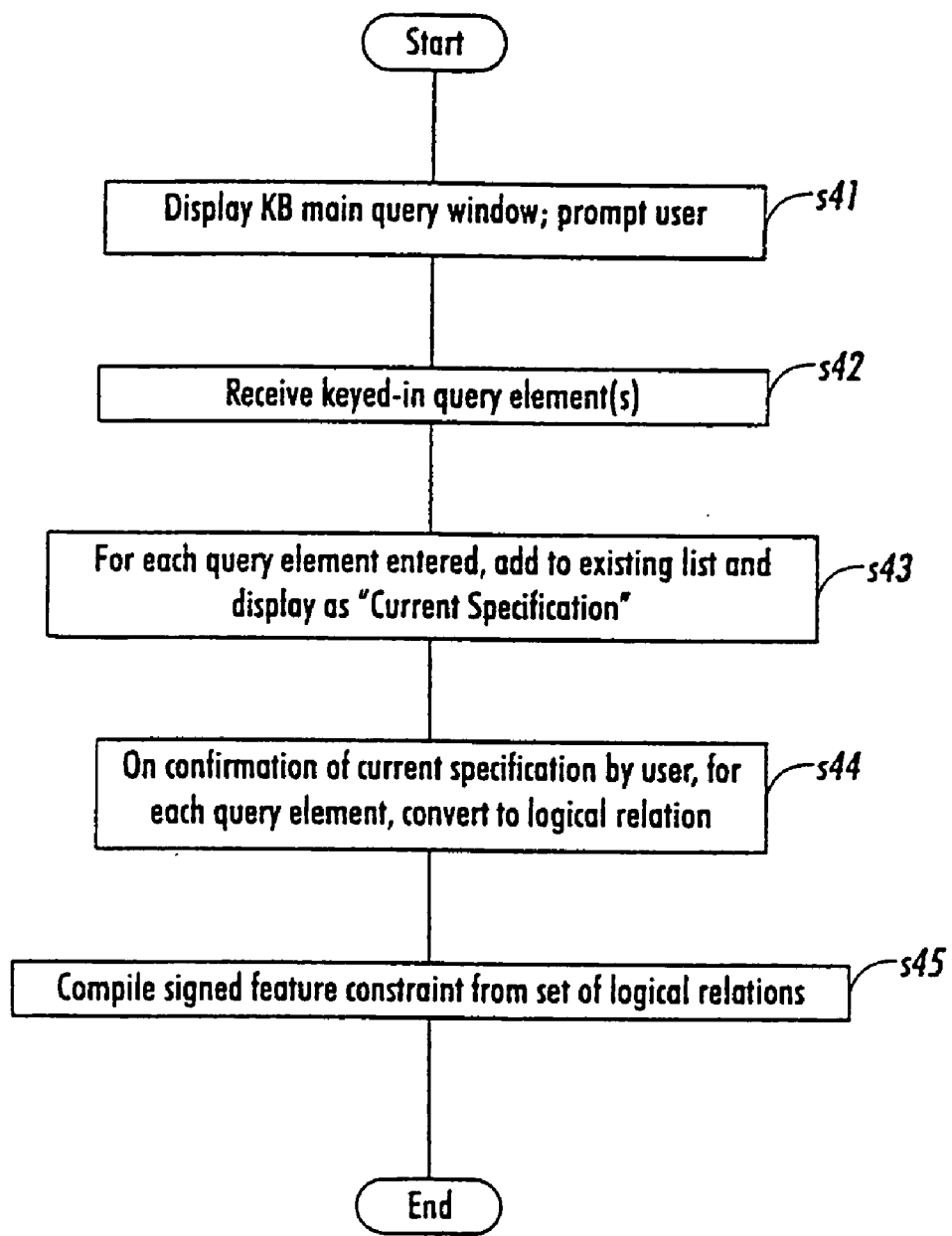
FIG. 4 is a schematic flow chart of operations in obtaining a constraint descriptor from user signals provided through user interface circuitry, such as in response to images as in FIG. 3.

FIG. 4 shows operations that can be performed by the processor of a device that presents images as in FIG. 3 in obtaining a document constraint descriptor. In box s41, the processor displays the knowledge broker (KB) main query window as shown in FIG. 3 and prompts the user to indicate that a query can be entered. In box s42, the processor receives a series of user signals through user interface circuitry that indicate keyed-in query elements. As shown in FIG. 3, the query elements can be attribute-value relations such as "title contains 'constraints'", indicating that the document attribute "title" has a value that includes the word "constraints", or "date after 90", indicating that the document attribute date has a year value greater than 1990. Several other types of attribute-value relations are described in relation to FIG. 5 below.

In box s43, the processor adds each query element from box s42 to an existing list of query elements in the current specification. The processor also updates the display by presenting an image in which the "Current Specification" in box 37 includes the added query element.

When the user launches a search by selecting button 38, thus confirming the current specification, the processor converts each query element in the existing list to a logical relation, in box s44. This can be accomplished by producing sorts and features as described above. For example, a data structure could be stored containing predefined mappings from standard query elements or standard types of query elements to logical relations. The processor can also store data indicating the logical relations in memory.

Once the logical relations are obtained, the processor can automatically compile a signed feature constraint from the logical relations, in box s45; this can be thought of as beginning to solve a constraint that is equivalent to the relations. To compile a signed feature constraint, the processor can, for example, perform conventional operations that eliminate redundancy, check for consistency, reorganize constraints by making local inferences, propagate information from one part of the feature constraint to another, and generally perform operations that make the representation of the constraint more concise. At one extreme, compilation may simply involve converting the logical relations into a format in which the equivalent constraint can be more readily solved; at the other extreme, compilation may involve completely solving the equivalent constraint. The compiled feature constraint can thus be an item of data that includes signs occurring in the stored relations, and is therefore a type of document constraint descriptor. The processor stores the compiled feature constraint in memory.

User signals indicating attribute-value relations could be provided interactively in various other ways. For example, the user could provide signals to the processor of a portable computing device, using a keyboard or a touchscreen user interface on which lists of items are displayed and can be navigated or selected using scrolling and control buttons. Where the screen of a device is too small for such techniques, members of a stored set of items of data could be accessed in the manner described in EP-A-733,964.

Figure 5:
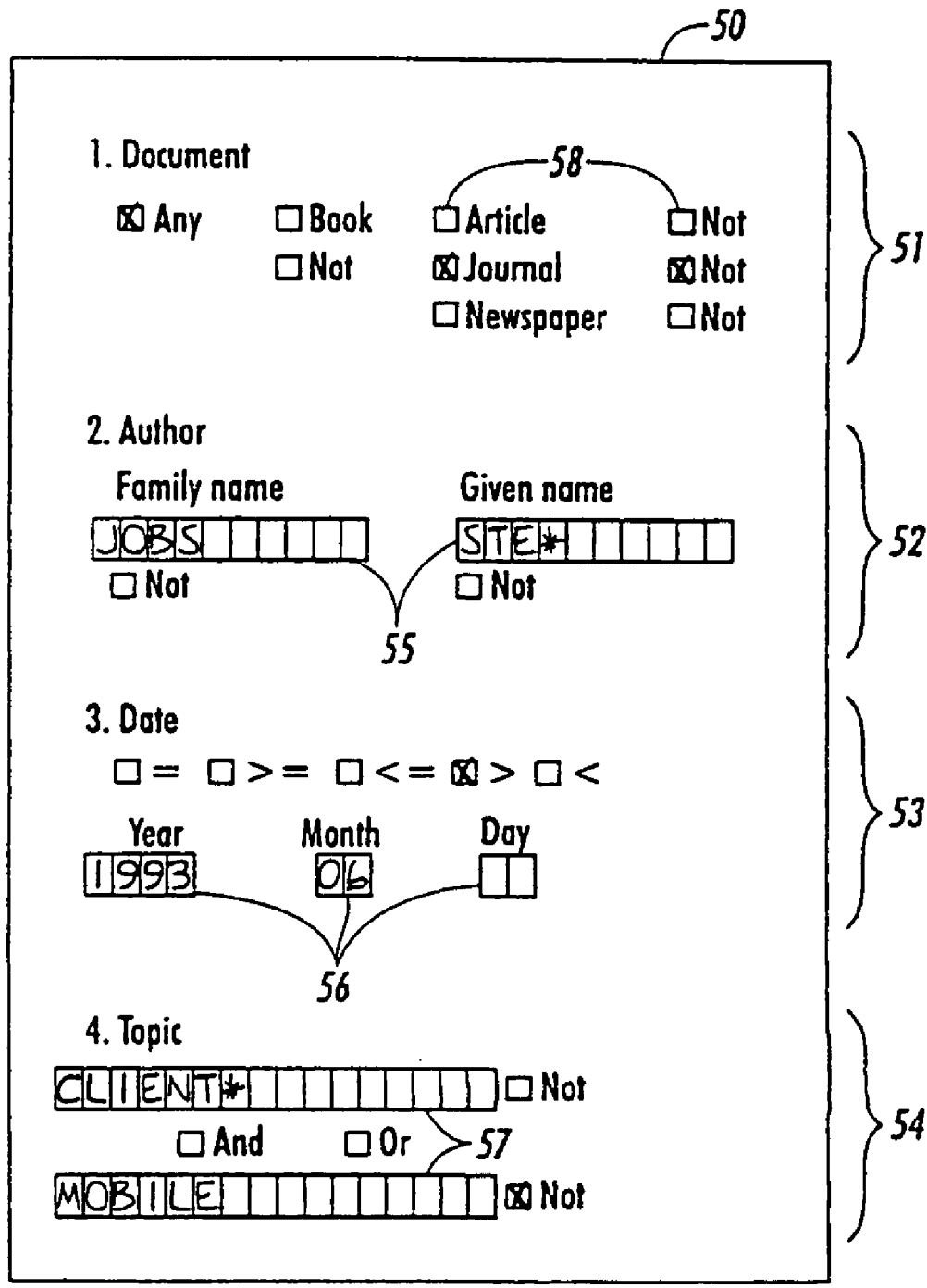
FIG. 5 is a schematic diagram showing features of a form that can be marked to provide user signals indicating attribute-value relations.

FIG. 5 shows query sheet 50 that a user can mark to indicate a query. Query sheet 50 could be printed on a sheet of paper or on another suitable image-bearing portable medium that can be scanned by the scanner of a multifunction device or a scanner connected to a fixed computing device. Query sheet 50 might alternatively be presented on a display with a touchscreen or other circuitry capable of sensing marking movements.

Query sheet 50 is a form that includes fields 51, 52, 53, and 54, each for indicating a set of values for a document attribute. As indicated by a human-readable title for each field, the user can indicate the type of a document in field 51, the author in field 52, the date in field 53, and the topic in field 54. Each field also includes human-readable cues on how its blank areas should be completed to indicate sets of values for attributes. Fields could be added, on the same sheet or other sheets, for various additional document attributes or for other information that could be used in requesting a search. A description of query sheet 50 can be stored, enabling a machine to apply appropriate recognition to checks, characters, or other marks handwritten, typed, or otherwise made in each field by a user, according to conventional techniques such as mark sensing, optical character recognition, and handwriting recognition.

In field 52, the user can write characters in boxes 55 to indicate the family name and given name of the author. The user can use a wildcard character "*" to indicate that a name may be completed by any combination of characters. The user can mark the "Not" box next to either name to indicate that the handwritten value should be excluded from the search results. In the illustrated example, the user has indicated that the value for the author's family name should be "JOBS" and the value for the author's given name should begin with the three letters "STE".

In field 53, the user can write characters in boxes 56 to indicate year, month, and day of the document. The user can also mark one of the boxes in the upper portion of field 53 to indicate whether the date should be equal to, after, or before the indicated date. In the illustrated example, the user has indicated that the value for the document's date should be after June 1993.

In field 54, the user can write characters in boxes 57 to indicate two topics, again using the wildcard character if appropriate. Field 54 also includes boxes that can be marked to indicate whether either topic should be excluded from the search and to indicate whether the topics should be combined by "And" or "Or". In the illustrated example, the user has indicated that the value for a topic of the document should begin with "client . . . " and that the values for topics of the document should not include "mobile".

In field 51, the user can mark boxes, such as boxes 58, to indicate the type of a document. In the illustrated example, the user has indicated that the value for the document's type should be any type other than "journal".

Figure 6:
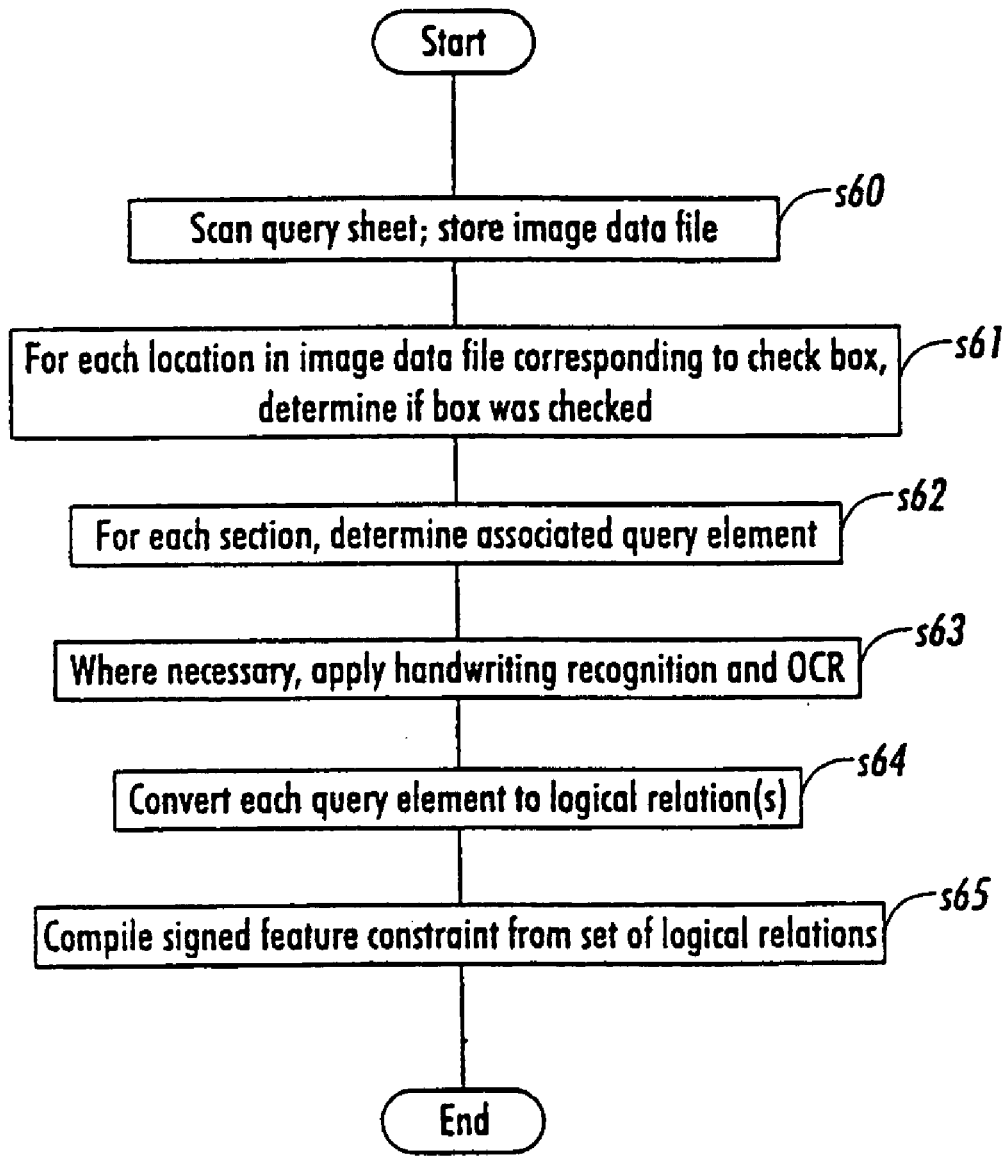
FIG. 6 is a schematic flow chart of operations performed in obtaining a constraint descriptor from user signals provided through a scanner, such as with a form as in FIG. 5.

FIG. 6 shows operations that can be performed by the processor of a device that receives user signals based on a scanned image of a query sheet as in FIG. 5 in obtaining a document constraint descriptor. In box s60, the query sheet is scanned and the processor stores the image data file in memory for processing. The image data file can, for example, be a bitmap of the image.

In box s61, the processor analyzes the image data file, applying appropriate criteria to determine, for each location of a check box, such as boxes 58, whether the data indicate that a check has been made in the box. The processor can store data indicating which check boxes have been checked.

In box s62, the processor can use the information from the check boxes and also images extracted from other boxes, such as boxes 55, 56, and 57, to determine query elements associated with each of fields 51, 52, 53, and 54. If a query element includes an image of a box that has been marked with a character, handwriting recognition or OCR can be performed as necessary to obtain values for the query element, in box s63. The processor can add each query element obtained in boxes s62 and s63 to an existing list of query elements in the current specification.

Then the processor can convert each query element in the existing list to a logical relation, in box s64. This can be accomplished in the same manner described above for box s44 in FIG. 4.

Once the logical relations are obtained, the processor can automatically compile a signed feature constraint from the logical relations, in box s65, as in box s45 in FIG. 4.

The processor could also present an image prompting the user to enter a query identifier, such as a short query name, through the user interface circuitry.

The processor can receive the name from the user, or can automatically generate a default name if no name is received. The processor can then store data associating the stored feature constraint with its name and with data defining an icon for the feature constraint. The processor can also present an image that includes the icon and name of the feature constraint.

The user interface circuitry of a portable computing device could present an image that includes icons with document names to represent document references such as stored Web URLs. In addition, the image could include icons and short query names, representing stored document constraint descriptors.

A document constraint descriptor could be transferred between two computing devices in the manner described in copending, coassigned U.S. patent application Ser. No. 09/421,752, entitled "Transferring Constraint Descriptors for Documents", incorporated herein by reference.

Figure 7:
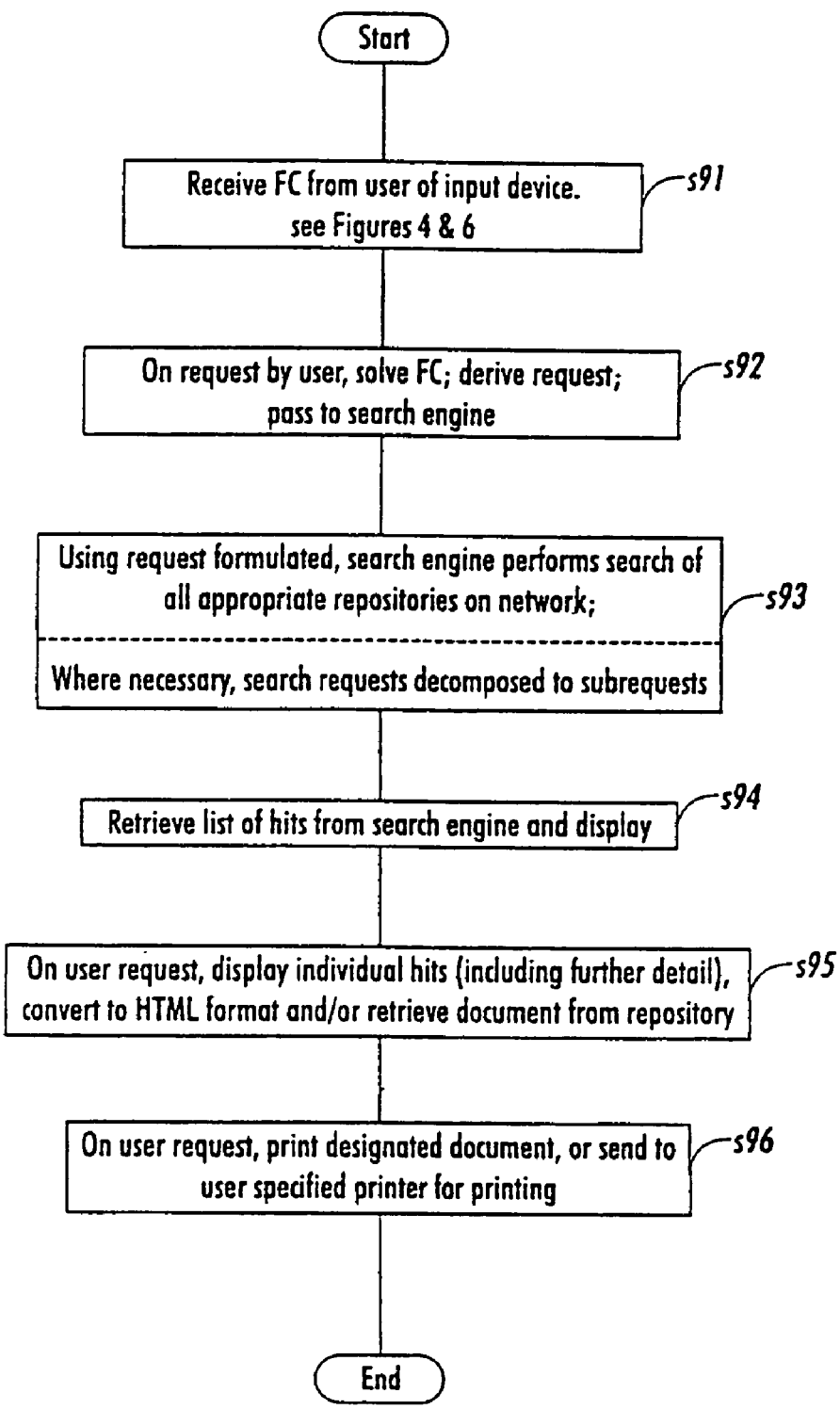
FIG. 7 is a schematic flow chart of operations performed in using a constraint to retrieve document references and the documents they indicate.

FIG. 7 illustrates operations performed by the processor of a computing device in using a document constraint descriptor, such as a feature constraint, to retrieve document references and in displaying or printing documents. The operations could be performed, for example, by the processor of a fixed computing device such as a conventional PC, Mac, or workstation or by a multifunction device or by a printer with an appropriate user interface.

In box s91, the processor receives a feature constraint from a device, such as from a device that obtained the feature constraint in accordance with FIG. 4 or FIG. 6, above. The processor can receive the feature constraint in a data packet from a portable computing device or in any other appropriate way.

In box s92, the processor receives further user signals requesting a search for documents satisfying the feature constraint. The user signals can again be received in any appropriate way, such as by presenting an image that includes an item representing the feature constraint and receiving a user signal selecting the item.

In response, the processor can solve the feature constraint using the techniques described above for solving basic feature constraints and signed feature constraints. If compilation in box s45 or box s65 completely solves the equivalent constraint, no further solution is necessary in box s92, but if compilation in box s45 or box s65 merely changes format or the like, it is necessary to perform all the remaining computation necessary to obtain a solution. Therefore, solving the constraint in box s92 can be thought of as completing the solution process that was begun by compiling in box s45 or box s65. The solution process could be divided between compilation and solving in many different ways, and the two operations could be at least partially redundant.

If the processor obtains a solution, the solution can be used to formulate a search request, which the processor can then provide in a call to search engine routines it also executes. In general, the search engine routines can in turn call remote search engines, such as through the Internet, and any appropriate combination of local and remote search operations can be employed.

In box s93, the processor executes the search engine routines and uses the search request formulated in box s92 to perform a search of all appropriate repositories on a network to which the computing device is connected. Alternatively, the search could be performed on any appropriate subset of the repositories. The search could include providing versions of the search request to other search engines on the network. Where necessary, the search engine can perform a brokering process that breaks down the search request from box s92 into subrequests as described in Andreoli, J.-M., Borghoff, U., and Pareschi, R., "The Constraint-Based Knowledge Broker Model: Semantics, Implementation and Analysis", *Journal of Symbolic Computation*, Vol. 21, No. 4, 1996, pp. 636–676, incorporated herein by reference. As will be understood, the brokering process may include scope splitting, specialization of brokers, and solution of constraints equivalent to subrequests.

Figure 8:
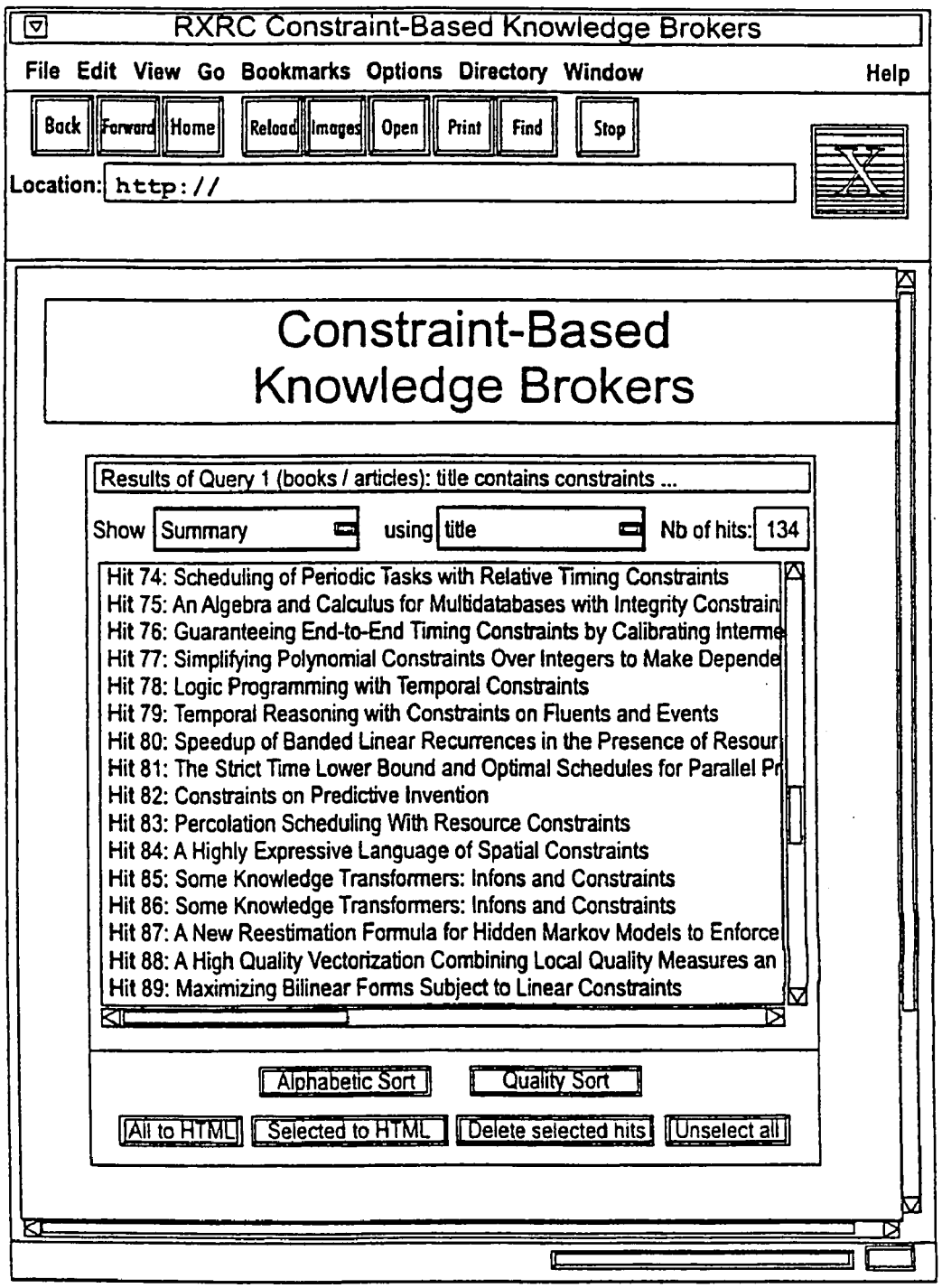
FIG. 8 is a schematic version of an image presented by a fixed computing device presenting a list of items representing document references, as in box s94 in FIG. 7.

The search engine routines return a list of "hits", i.e. document references such as Web URLs identifying documents satisfying the feature constraint. In box s94, the processor retrieves the list of hits and presents an image that includes information about the hits. FIG. 8 illustrates an example of an image that could be presented, with a window in which each hit is represented by an item in the form of a line of text. Each hit's line of text includes the hit's number and a brief description of the document indicated by the hit, such as the document's title.

The user can provide input signals requesting information about one or more identified individual hits. In response, in box s95, the processor can present one or more further images with information about the identified individual hits, such as by presenting a hit with expanded details about the document, by presenting document information converted into HTML format, or by presenting a version of the document itself downloaded from the repository that contains it.

Figure 9:
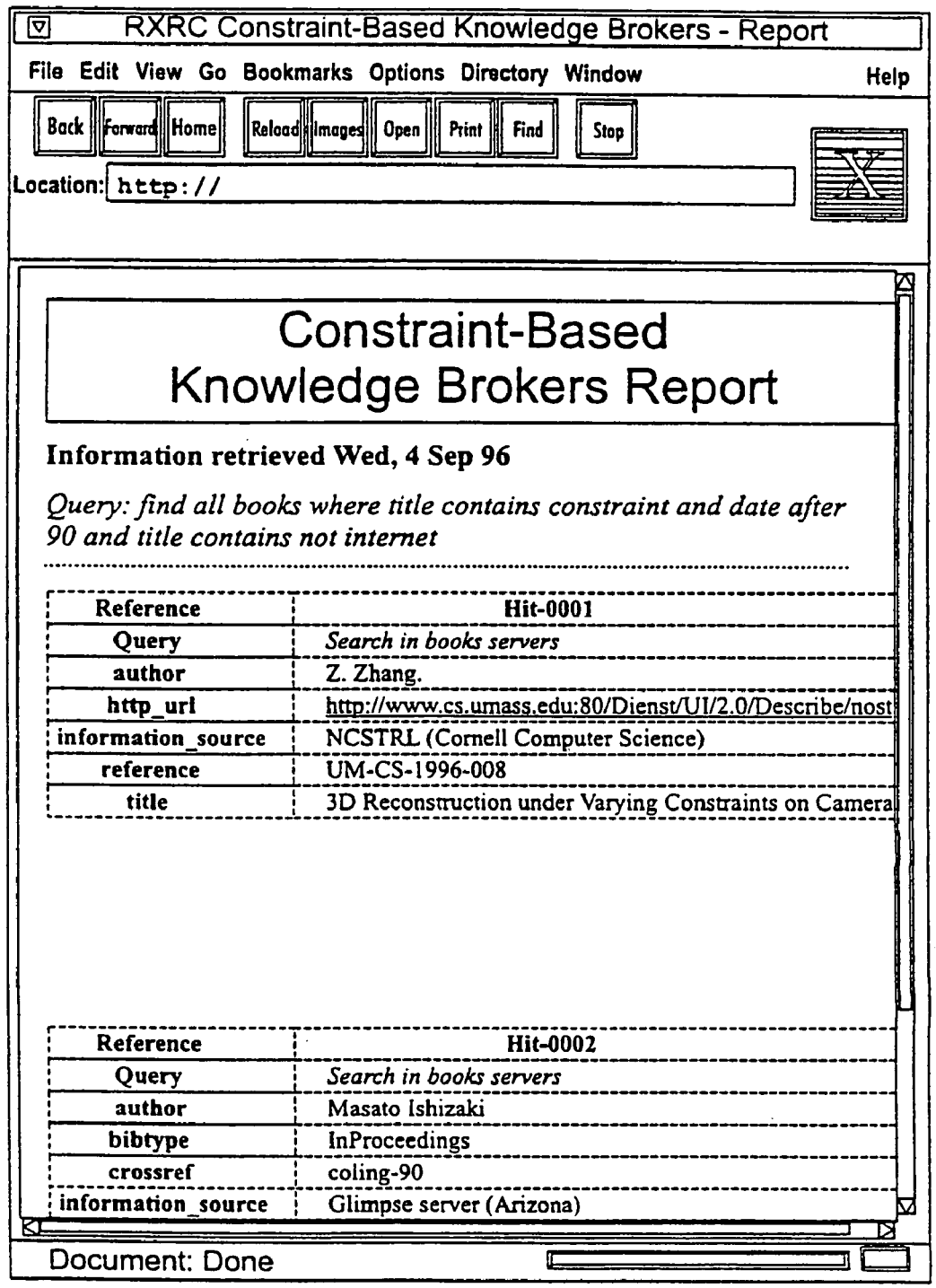
FIG. 9 is a schematic version of an image presented by a fixed computing device showing selected items from the list in FIG. 8 after transformation into HTML format, as in box s95 in FIG. 7.

FIG. 9 illustrates an example of an image that could be presented in box s95, in which the information about each hit has been converted into HTML format. For each hit, the display information can include author name, http URL, information source, reference, and title.

Figure 10:
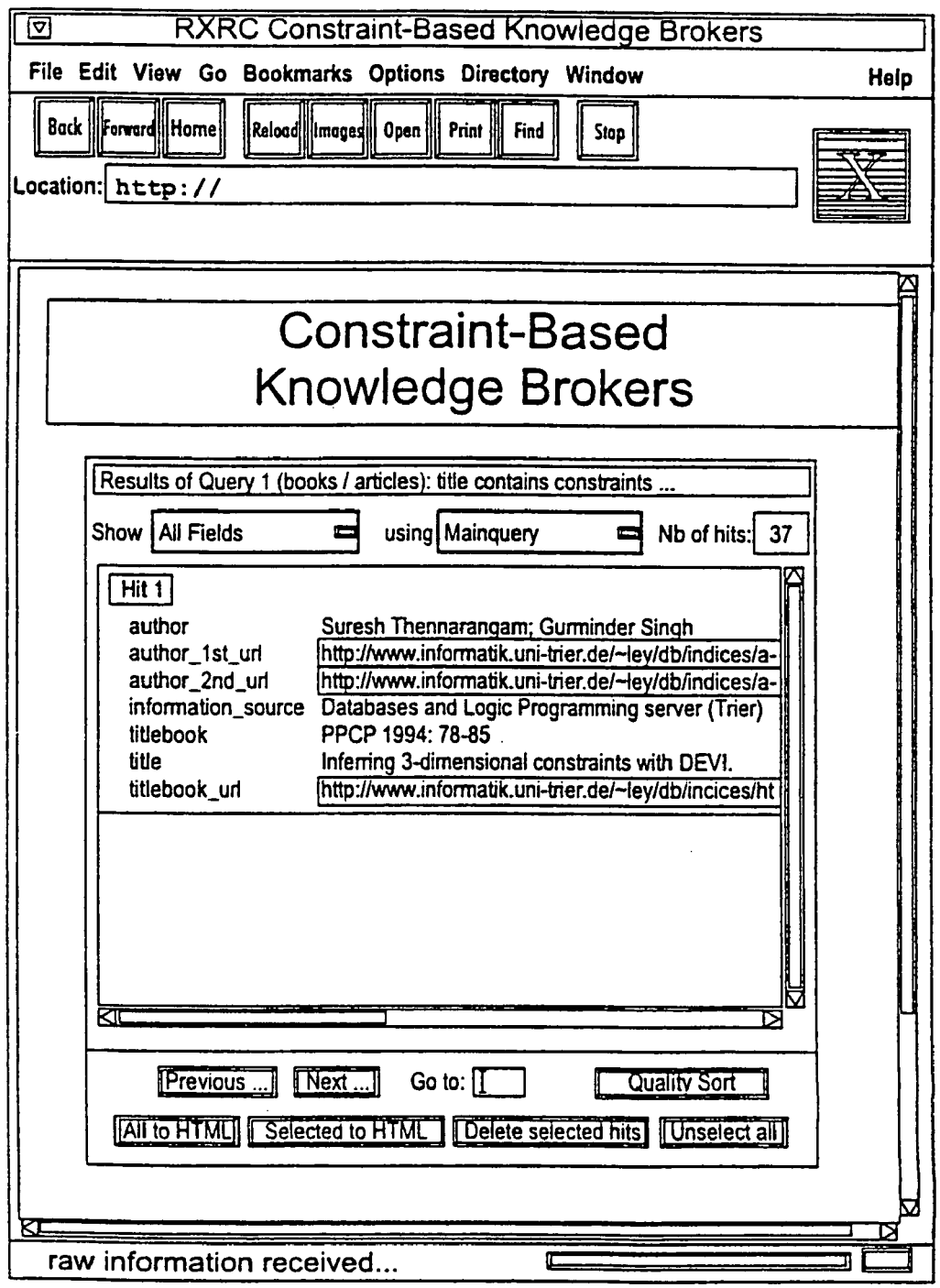
FIG. 10 is a schematic version of an image presented by a fixed computing device presenting in more detail a single item from the list in FIG. 8.

FIG. 10 illustrates another example of an image that could be presented in box s95, in which a more complete set of attributes of one hit's document is included. In FIG. 10, the displayed values for some of the attributes are not explicitly shown, but are shown as URLs that provide links to pages that contain information related to those attributes.

The user can also provide input signals requesting that a hit's document be printed or be sent to a user specified printer for printing. In response, in box s96, the processor can download the document and print it on the user's default printer or on a user specified printer.

D. Variations

The implementations described above could be varied in numerous ways within the scope of the invention.

The implementation described above has been successfully executed using machines specified above, but implementations could be executed on other machines.

The implementation described above has been successfully executed using software described above, but various other software could be used, developed for a wide variety of programming environments and platforms. For example, techniques other than knowledge brokers and feature constraints could be used.

The implementation described above obtains document constraint descriptors that are signed feature constraints obtained in specified ways using logical relations equivalent to attribute-value relations, but the invention could be implemented to obtain other types of document constraint descriptors, including basic feature constraints and built-in constraints, and with logical relations and constraints obtained in various other ways from attribute-value relations. For example, the mapping from attribute-value relations to logical relations could be performed algorithmically or using any of a wide variety of data structures, and constraints could be obtained from logical relations using any of a wide variety of compilation and solution techniques.

The implementation described above can transfer constraints between specified types of computing devices using specified communication techniques such as IrDA standard data transfer and the Internet, but the invention could be implemented to transfer constraints between a wide variety of different computing devices and using any of a wide variety of communication techniques. For example, the invention could be implemented using devices that are all connected to a network, or it could be implemented using devices that cannot communicate through a network, but can only communicate through electromagnetic waves such as IR or radio waves, or it could be implemented using any combination of such devices.

In the implementation described above, the computing devices have user interface circuitry that includes specified types of devices, such as displays, keyboards, touchscreens, buttons, mice, but the invention could be implemented with any suitable kind of user interface circuitry.

The implementation described above presents specific types of images in which items include icons and names or titles, but the invention could be implemented with or without presentation of images, and the images presented could take any appropriate form, with or without icons and with or without names or titles. The images could, in addition, be presented through a paper user interface using printed check boxes on paper or the like.

The implementation described above employs URLs as document references, but document references could take any appropriate form. For example, the World Wide Web Consortium (W3C) defines uniform resource names (URNs) that could be used.

The implementation described above uses search engine routines to find documents satisfying a constraint, and a wide variety of search engines using various search techniques could be used to find such documents.

In the implementation described above, documents are retrieved for display or printing, but documents or knowledge from documents could instead be retrieved for other purposes, such as to generate a new document.

The implementation described above mentions several specific attributes of documents with specific types of values, but a wide variety of other document attributes could be used, with various types of values. Furthermore, the implementation described above treats attributes or features of documents as independent, and could be applied even to attributes or features with trivial dependencies that can be ignored, but a different approach might be required to obtain optimal results with attributes or features that have complex dependencies.

In the implementation described above, specific acts are performed that could be omitted or performed differently. For example, in FIG. 4, a logical relation could be obtained and feature constraint compilation could be performed after each query element is added to the list, or it could only be performed when requested by a user.

In the implementation described above, acts or operations are performed in an order that could be modified in many cases. For example, in FIG. 7, individual hits could be displayed immediately when obtained from the search engine rather than first displaying a list of hits.

The implementation described above uses currently available computing techniques, but could readily be modified to use newly discovered computing techniques as they become available.

E. Applications

The invention can be applied to document information retrieval and distribution, such as in a system that employs the Internet. The system can include a combination of portable and fixed computing devices.

F. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A computer implemented method for obtaining document constraint descriptors based on user signals, the method comprising:
    (A) receiving user signals indicating a set of attribute-value relations that can apply to documents;
    (B) using the user signals to obtain logical relations equivalent to the attribute value relations, the logical relations comprising at least one of a sort and a feature; and
    (C) using the logical relations to obtain, without user intervention, a document constraint descriptor defining a set of one or more constraints equivalent to the logical relations.

2. The method of claim 1 in which the method is performed with a machine that includes user interface circuitry for receiving user signals and in which (A) comprises:
    (A1) receiving a series of one or more user signals through the user interface circuitry, the series of user signals indicating the attribute-value relations.

3. The method of claim 2 in which the series of user signals includes two or more user signals.

4. The method of claim 2 in which the machine is a portable computing device and the user interface circuitry includes a touchscreen or a keyboard.

5. The method of claim 2 in which the machine is a fixed computing device and the user interface circuitry includes one or more of a touchscreen, a keyboard, and a mouse.

6. The method of claim 2 in which the machine is a multifunction device, in which the user interface circuitry includes a scanner, and in which (A1) comprises:
    scanning at least a part of an image-bearing portable medium to produce electronic signals; and
    using the electronic signals to obtain the series of one or more user signals.

7. The method of claim 6 in which the medium is a form that includes one or more fields, at least one of the fields having a human readable indication of an attribute and an area that a user can mark to indicate a set of at least one value of the attribute.

8. The method of claim 2 in which the user interface circuitry includes display circuitry for presenting images to a user and selection circuitry the user can operate to provide signals indicating items in images presented by the display circuitry, in which the machine includes memory, and in which (C) comprises:
    storing the document constraint descriptor in memory;
    the method further comprising:
    (D) presenting an image through the display circuitry that includes an item representing the document constraint descriptor;
    (E) receiving a user signal from the selection circuitry indicating the item; and
    (F) in response to the user signal, obtaining the stored document constraint descriptor.

9. The method of claim 1 in which the machine is connected through a network for accessing a repository of electronic documents; the method further comprising:
    (G) solving the set of one or more constraints to obtain a solution and using the solution to obtain one or more document references, each document reference indicating an electronic document in the repository that satisfies the set of one or more constraints.

10. The method of claim 9 in which the user interface circuitry includes display circuitry for presenting images to the user and selection circuitry the user can operate to provide signals indicating items in images presented by the display circuitry; the method further comprising:
    (H) presenting an image through the display circuitry that includes, for each document reference, an item representing the document reference;
    (I) receiving a user signal through the selection circuitry indicating a first item representing one of the document references; and
    (J) in response to the user signal, retrieving from the repository the electronic document indicated by the first item's document reference.

11. The method of claim 10 in which (J) comprises:
    presenting a portion of the electronic document through the display circuitry.

12. The method of claim 10 in which the machine further includes printing circuitry and in which (J) comprises:
    operating the printing circuitry to print the electronic document.

13. A machine for obtaining document constraint descriptors based on user signals, the machine comprising:
    a processor; and
    user interface circuitry for providing user signals to the processor;
    the processor operating to:
        receive user signals through the user interface circuitry indicating a set of attribute-value relations that can apply to documents;
        use the user signals to obtain logical relations equivalent to the attribute-value relations, the logical relations comprising at least one of a sort and a feature; and
        use the logical relations to obtain a document constraint descriptor defining a set of one or more constraints equivalent to the logical relations.

14. The machine of claim 13 in which the machine is a portable computing device.

15. The machine of claim 13 in which the machine is a fixed computing device and the machine is connected to a repository of electronic documents that includes one or more documents that satisfy the set of one or more constraints, the processor further operating to:

use the document constraint descriptor to solve the set of one or more constraints to obtain a solution, and use the solution to obtain one or more document references, each document reference indicating a document that satisfies the set of one or more constraints.

16. The machine of claim 15 in which the user interface circuitry includes display circuitry for presenting images to a user and selection circuitry the user can operate to provide signals indicating items in images presented by the display circuitry; the processor further operating to:

present an image through the display circuitry that includes, for each document reference, an item representing the document reference;

receive a user signal through the selection circuitry indicating an item representing a selected one of the document references; and in response to the user signal, access the selected document reference.

* * * * *